US006760740B2

(12) United States Patent
Van Den Enden et al.

(10) Patent No.: US 6,760,740 B2
(45) Date of Patent: Jul. 6, 2004

(54) METHOD OF CALCULATING LINE SPECTRAL FREQUENCIES

(75) Inventors: Adrianus Wilhelmus Maria Van Den Enden, Eindhoven (NL); Eric Kathmann, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 305 days.

(21) Appl. No.: 09/897,366

(22) Filed: Jul. 2, 2001

(65) Prior Publication Data

US 2002/0032562 A1 Mar. 14, 2002

(30) Foreign Application Priority Data

Jul. 5, 2000 (EP) ........................................... 00202383

(51) Int. Cl.$^{7}$ ................................................ G06F 17/10
(52) U.S. Cl. ...................................................... 708/300
(58) Field of Search .................................. 708/300–323

(56) References Cited

U.S. PATENT DOCUMENTS 5,233,659 A * 8/1993 Ahlberg ...................... 704/219
5,664,055 A * 9/1997 Kroon ........................ 704/223
5,699,485 A * 12/1997 Shoham ...................... 704/223
5,732,389 A * 3/1998 Kroon et al. ............... 704/223
6,173,257 B1 * 1/2001 Gao ........................... 704/220

OTHER PUBLICATIONS

Kabal et al, "The computation of line spectral frequencies using chebyshev polynomials", IEEE Trans. on Acoustics, . . . vol. 34 No. 6 , Dec. 1986 , pp. 1419–1426.*
Bogley, "Quadratic approximation", ©Calculus Quest Version 1 , 1996 Retrieved from the Internet: <URL: www.orst.edu/instruct/mth251/cq/stage9/Lesson/quad.htm>.*
Rothweiler, "A rootfinding algorithm for line spectral frequencies", Acoustics, Speech, and Signal Processing, 1999. ICASSP'99. Proceedings., 1999 IEEE International Conference on, vol. 2, Mar. 15–19, 1999, pp. 661–664.*

* cited by examiner

*Primary Examiner*—Tan V. Mai

(57) ABSTRACT

In a method of encoding a source signal by determining Line Spectral Frequencies (LSFs) for representing Linear Predictive Coding (LPC) filter coefficients, real zeros are determined in associated polynomials P" and Q" in cos(mω), with each polynomial being a series of Chebyshev polynomials, a search for real zeroes being performed by evaluating the associated polynomials in a series of steps of a real variable u, an approximation of cos(mω) as a function of the real variable u being employed.

14 Claims, 1 Drawing Sheet

METHOD OF CALCULATING LINE SPECTRAL FREQUENCIES

The present invention relates to a method of encoding a source signal by calculating or determining Line Spectral Frequencies (LSFs) by determining real zeros in associated P"(z) and Q"(z) polynomials in cos(mω) and, with the polynomials written as a series of Chebyshev polynomials, evaluating cos(ω) per function evaluation.

The coding of source signals such as speech signals, is used particularly in the field of mobile communications since the coded speech signal can be transmitted in a manner in which the redundancy commonly experienced in human speech is reduced. Linear Predictive Coding (LPC) is a known technique normally used in speech coding and in which the correlation of the speech signal is removed by means of a filter. The filter is best described by way of one of a different set of parameters, and one important set of which comprises LSFs.

An accurate representation of the filter is an important requirement since such information is transmitted with the speech signal for subsequent reconstruction of the speech signal at a signal-receiving unit.

The advantages of representing LPC filter coefficients in the form of LSFs have been well-documented since the inception of this concept in 1975. However, disadvantages are also experienced in that the LSFs cannot be easily computed for higher-order LPC filters and numerical methods are needed to calculate the zeros of the various functions.

As is well known, the representation of an inverse LPC filter A(z) in the form of LSFs is derived from the representation of A(z) by its set of zeros in the z-plane. Insofar as the function A(z) represents an all-zero filter, it can be fully and accurately described by way of reference to its corresponding set of zeros.

Computation of the LSFs commences with the decomposition of the polynomial $A_m(z)$ of order m into two inverse polynomial functions P(z) and Q(z). For confirmation, the polynomial $A_m$ (z) and the two inverse polynomials appear as follows:

$$A_m(z)=1+\alpha_1 z^{-1}+\alpha_2 z^{-2}+ \dots +\alpha_m z^{-m}$$

and $$P(z)=A_m(z)+z^{-(m+1)}A_m(z^{-1})$$

$$Q(z)=A_m(z)-z^{-(m+1)}A_m(z^{-1})$$

The polynomials P(z) and Q(z) each have (m+1) zeros and exhibit various important characteristics. In particular: all zeros of P(z) and Q(z) are found on the unit circle in the z-plane; the zeros of P(z) and Q(z) are interlaced on the unit circle and the zeros do not overlap; and the minimum phase property of $A_m(z)$ is easily preserved when the zeros of P(z) and Q(z) are quantised.

Analysis of the above confirms that z=−1 and z=+1 is always zero with the functions P(z) and Q(z) and since these zeros do not contain any information relating to the LPC filter, they can simply be removed from P(z) and Q(z) by dividing by $(1+z^{-1})$ and $(1-z^{-1})$.

Such revised functions can be represented when m is even as follows:

$$P'(z) = \frac{P(z)}{(1+z^{-1})} \text{ and } Q'(z) = \frac{Q(z)}{(1-z^{-1})}$$

and when m is odd as:

$$P'(z) = P(z) \text{ and } Q'(z) = \frac{Q(z)}{(1-z^{-1})(1+z^{-1})}.$$

The advantageous properties of functions P(z) and Q(z) as noted above are also valid for P'(z) and Q'(z). Since the coefficients of P'(z) and Q'(z) comprise real numbers, the zeros form complex conjugate pairs such that the search for zeros only has to be conducted on the upper half of the unit circle, i.e. where 0<ω<π.

It generally proves inconvenient to compute complex zeros, particularly by way of computerised numerical analysis methods, and so the functions P'(z) and Q'(z) are transformed to functions P"(z) and Q"(z) with real zeros. Also, the functions P'(z) and Q'(z) always have an even order and, since they are symmetrical, the functions can be re-written with real zeros to the following manner:

$$P''(\omega) = 2\sum_{i=0}^{m_p} p_i'' \cos((m_p - i)\omega)$$

$$Q''(\omega) = 2\sum_{i=0}^{m_q} q_i'' \cos((m_q - i)\omega)$$

where $$p_0''=1,\ p_{1,2 \dots m_p-1}''=p_{1,2 \dots m_p-1}',\ p_{m_p}''=\tfrac{1}{2}p_{m_p}', q_0''=1,\ q_{1,2 \dots m_q-1}''=q_{1,2 \dots m_q-1}''=q_{1,2 \dots m_q-1}',\ q_{m_q}''=\tfrac{1}{2}q_{m_q}', \text{ and}$$

where $m_p$ is equal to the number of zeros of P'(z) on the upper half of the unit circle and where $m_q$ is equal to the number of zeros of Q'(z) on the upper half of the unit circle.

When seeking the zeros of these functions, advantage can be taken from the form of the representations for P"(z) and Q"(z) due to the fact that the number of zeros to be located is already known. One particular method for identifying the zeros is by searching the interval [0,π] by effectively stepping, with relatively small steps, through the aforesaid interval and identifying a small interval within which a change in the sign of the function indicates that an odd number of zeros must be present within that interval. Thus, if the step size is small enough, there is a great probability that there is only one zero in the interval.

Once the LSFs have been identified and employed as required, the recomputation of the LPC filter coefficients from the LSFs can readily be achieved. This stage represents a much less computationally intensive calculation than the computation of the LSFs from the filter coefficients as discussed above.

Returning to the functions P"(z) and Q"(z), these can be readily computed if the polynomials are written as a series of Chebyshev polynomials wherein, by using the map x=cos (ω), cos(mω) can be represented as: cos(mω)=$T_m(x)$ where $T_m(x)$ is a mth-order Chebyshev polynomial in x.

Since the roots of polynomials P"(z) and Q"(z) are interlaced, a logical first step is to merely find the roots of P"(z) after which the roots of Q"(z) are easily found. As noted above, the task of finding all roots of P"(z) employs stepping at very small intervals through the range [0,π]. In view of the above-mentioned mapping of x=cos(ω), cos(ω) must be calculated for every function evaluation. The cosine function is a computationally complex and computationally expensive function and to reduce this problem equidistant steps in the x-domain can be considered. However, around the values of ω=0 and ω=π relatively large steps are made and to compensate for this the step size must be decreased in these areas in order to accurately identify single roots and this disadvantageously means that additional processing is required.

Additionally the approach of stepping through the x-domain directly with equidistant steps within the interval [1,−1] leads to a problematic frequency-dependant accuracy of the zeros located. Disadvantageously, problems still arise even though the use of Chebyshev polynomials allows the evaluation of the single cos(ω) per function evaluation. As noted, the above-mentioned use of small steps increases the complexity of the search procedure.

The present invention seeks to provide for a method of calculating LSFs which exhibits advantages over the above-mentioned known methods.

According to one aspect of the invention, there is provided a method of calculating LSFs as defined above and characterised by introducing the mapping x=cos(ω) and by the step of providing an approximation for the cosine function.

The invention is advantageous in that, by adopting the approximation, the frequency dependent accuracy of the located zeros is improved and the complexity of the method compares favourably with the prior art methods.

As will be appreciated the method of the present invention overcomes problems encountered within the prior art with regard to the calculation of the LSFs and relating to the calculation of the roots of the relevant polynomials. This is a particularly important aspect in the field of LPC since if such calculations are not carried out correctly, numerical problems can readily arise when the calculations are performed using 32 bit floating-point numbers or using integers.

The invention is described further hereinafter, by way of example only, with reference to the accompanying drawings which:

Figure 1:
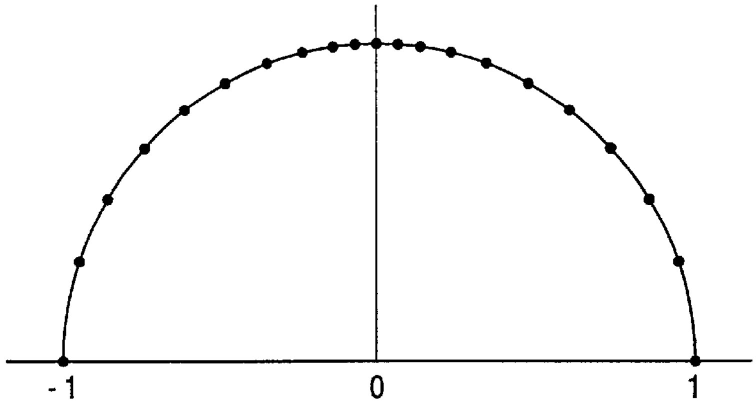
FIG. 1 illustrates the taking of equidistant steps in the x-domain when calculating the roots of the functions P and Q as known in the prior art.

Turning first to FIG. 1, since the roots of P(ω) and Q(ω) are interlaced it is first commonly decided to find all roots of P(ω). After this is done the roots of Q(ω) can easily be found as they are located in-between the roots of P(ω). The roots of P(ω) can be found by taking small steps in the interval of [0,π] to find the sign changes of P(ω) and as noted above, the mapping x=cos(ω) is used and the use of equidistant steps in the x-domain means that around ω=0 and ω=π the step size in ω is much larger that the step size around $$\omega = \frac{\pi}{2}$$

as illustrated with reference to FIG. 1.

FIG. 1 shows what happens in ω if 20 equidistant steps in x-domain are made. As can be seen, around ω=0 and ω=π large steps are made. To compensate for this, the step size must be decreased in these areas to prevent two roots being found within one step. That is, with two roots, no sign change will occur and so the roots are not found. This means that extra processing and book keeping is needed.

With adoption of the mapping x=cos(ω), an advantageous and computationally relatively simple approximation of the cosine function can be made by $$x=1-u^2 \quad 0<u\leqq 1$$

$$x=-1+(2-u)^2 \quad 1<u\leqq 2.$$

Figure 2:
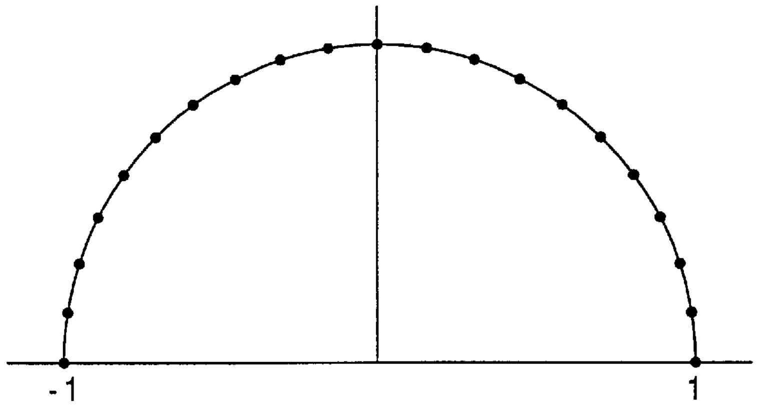
FIG. 2 illustrates the taking of equidistant steps in the u-domain in accordance with the employment of the present invention.

As will be appreciated, with this approximation of a new interval, a variable u is introduced and FIG. 2 indicates what happens in the ω-domain if 20 equidistant steps in u between 0 and 2 are taken. As can be seen, while the steps in the ω-domain are not necessarily equidistant, they do however exhibit greater regularity than the steps illustrated in relation to FIG. 1. It is considered that the degree of regularity is sufficient to enable the identification of single roots within one step without requiring extra processing in which the interval of co in the function is evaluated.

Figure 3:
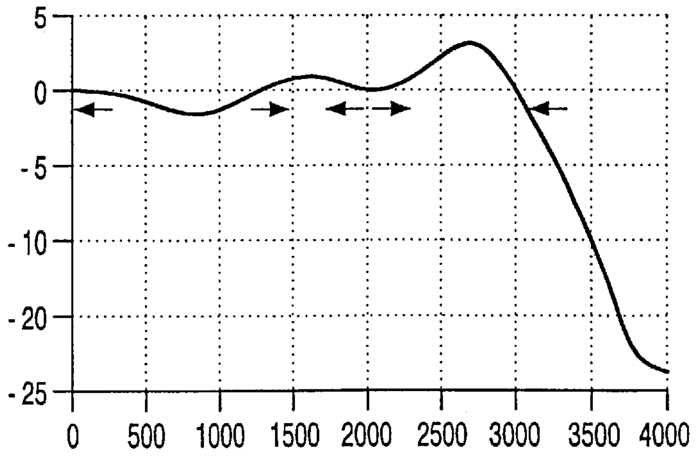
FIG. 3 illustrates an example of the P(z) polynomial.

FIG. 3 shows an example of a P' polynomial. The P' polynomial is sampled with 4000 points using the cosine approximation described above. This P' polynomial was calculated from a set of parameters from a system which had a single 2000 Hz sine-wave tone as an input signal. In FIG. 3, it can be seen that the roots can be very close together. The distance between the two roots at 2000 Hz is only forty-three sample points. To make sure that all zero crossings will be found in the P' polynomial the step size must be smaller than forty-three points. In one example twenty-five sample points are taken and this means that the P' polynomial must be evaluated (4000/25)=160 times to find the 5 zero crossings. After this initial search the roots can be found by subdividing the intervals. Evaluating the P' polynomial 160 times in the initial search is quite computationally expensive.

An advantageous method can be to evaluate the P' polynomial a predetermined number of times and employing a small number of subintervals. The number of zero crossings is identified and if not all zero crossings are located, a second, and higher resolution, search is conducted employing smaller subintervals.

Since the probability of multiple zero crossings is high for those subintervals with small function values at their edges.

A good balance between the first and second stages of the search has been found when $4*m_p$ intervals are generated. When not all zero crossings are found, then the candidate intervals are sampled with a 8 times higher resolution. This results in a search which has proved successful in locating all zero crossings.

What is claimed is:

1. A method of encoding a source signal by determining line spectral frequencies for representing linear predictive coding filter coefficients, said method comprising determining real zeros in associated polynomials in cos(mω), where m is an integer and ω is a variable angle, each of said associated polynomials comprising a series of Chebyshev polynomials, wherein a search for the real zeroes is performed by evaluating the associated polynomials in a series of steps in value of a variable, values of cos(ω) being determined from an approximation of cos(ω) as a function of a real variable u.

2. The method as defined in claim 1, wherein the steps in value are of the real variable u and the approximation of cos(ω) as a function of the real variable u is $$\cos(\omega)=1-u^2 \quad 0<u\leqq 1$$

$$\cos(\omega)=-1+(2-u)^2 \quad 1<u\leqq 2.$$

3. The method as defined in claim 1, wherein the search for real zeroes comprises an initial search stage employing relatively large step intervals between values of the variable.

4. The method as defined in claim 3, wherein in the initial search stage the associated polynomials are evaluated less than 160 times.

5. The method as defined in claim 3, wherein the search for real zeroes further comprises a high resolution search stage employing relatively small step intervals between values of the variable if it is determined that not all real zeroes have been found in the initial search stage.

6. The method as defined in claim 5, wherein the high resolution search stage employs step intervals between values of the variable of at least twenty-five sample points of reference.

7. The method as defined in claim 2, wherein the search for the real zeroes comprises an initial search stage employing relatively large step intervals between values of the variable u and further comprises a high resolution search stage employing relatively small step intervals between values of the variable u if it is determined that not all real zeroes have been found in the initial search stage.

8. An encoder for encoding a source signal, wherein the encoder is arranged for determining line spectral frequencies for representing linear predictive coding filter coefficients by determining real zeros in associated polynomials in cos (mω), where m is an integer and ω is an angle, each of said associated polynomials comprising a series of Chebyshev polynomials, wherein a search for the real zeroes is performed by evaluating the associated polynomials in a series of steps in value of a real variable, values of cos(ω) being determined from an approximation of cos(ω) as a function of a real variable u.

9. The encoder as defined in claim 8, wherein the steps in value are of the real variable u and the approximation of cos(ω) as a function of the real variable u is:

$$\cos(\omega)=1-u^2 \quad 0<u\leqq 1$$

$$\cos(\omega)=-1+(2-u)^2 \quad 1<u\leqq 2.$$

10. The encoder as defined in claim 8, wherein the search for the real zeroes comprises an initial search stage employing relatively large step intervals between values of the variable u.

11. The encoder as defined in claim 10, wherein in the initial search stage the associated polynomials are evaluated less than 160 times.

12. The encoder as defined in claim 10, wherein the search for real zeroes further comprises a high resolution search stage employing relatively small step intervals between values of the variable u if it is determined that not all real zeroes have been found in the initial search stage.

13. The encoder as defined in claim 12, wherein the high resolution search stage employs step intervals between values of the variable u of at least twenty-five sample points of reference.

14. A communication device comprising an encoder which is arranged for determining line spectral frequencies for representing linear predictive coding filter coefficients by determining real zeros in associated polynomials in cos(ω), where m is an integer and ω is an angle, each of said associated polynomials comprising a series of Chebyshev polynomials, wherein a search for the real zeroes is performed by evaluating the associated polynomials in a series of steps in value of a real variable u, values of cos(ω) being determined from an approximation of cos(ω) as a function of the real variable u which is:

$$\cos(\omega)=1-u^2 \quad 0<u\leqq 1$$

$$\cos(\omega)=-1+(2-u)^2 \quad 1<u\leqq 2.$$

* * * * *